US010332328B2

(12) United States Patent
Delevoye

(10) Patent No.: US 10,332,328 B2
(45) Date of Patent: Jun. 25, 2019

(54) DEVICE FOR PROTECTING THE ACCESS TO A VEHICLE BY MEANS OF A MOBILE PHONE

(71) Applicant: RENAULT s.a.s, Boulogne-billancourt (FR)

(72) Inventor: Antoine Delevoye, Cernay-la-Ville (FR)

(73) Assignee: RENAULT s.a.s, Boulogne-billancourt (FR)

( * ) Notice: Subject to any disclaimer, the term of this patent is extended or adjusted under 35 U.S.C. 154(b) by 0 days.

(21) Appl. No.: 14/895,379

(22) PCT Filed: Jun. 3, 2014

(86) PCT No.: PCT/FR2014/051313
§ 371 (c)(1),
(2) Date: Jan. 15, 2016

(87) PCT Pub. No.: WO2014/195626
PCT Pub. Date: Dec. 11, 2014

(65) Prior Publication Data
US 2016/0140788 A1 May 19, 2016

(30) Foreign Application Priority Data
Jun. 3, 2013 (FR) ..................................... 13 55073

(51) Int. Cl.
*G05B 19/00* (2006.01)
*G07C 9/00* (2006.01)
(Continued)

(52) U.S. Cl.
CPC ......... *G07C 9/00309* (2013.01); *G07C 5/008* (2013.01); *G07C 9/00571* (2013.01);
(Continued)

(58) Field of Classification Search
CPC ................ G07C 9/00309; G07C 5/008; G07C 9/00571; G07C 9/00857; G07C 5/08; G07C 2009/00317
(Continued)

(56) References Cited

U.S. PATENT DOCUMENTS 7,123,127 B2 * 10/2006 Mosgrove ............... B60R 25/23 340/5.21
8,943,187 B1 * 1/2015 Saylor ................... H04L 67/306 709/223
(Continued)

FOREIGN PATENT DOCUMENTS

GB 2 402 840 A 12/2004
WO 2011/147893 A1 12/2011
(Continued)

OTHER PUBLICATIONS

International Search Report dated Aug. 13, 2014 in PCT/FR14/051313 Filed Jun. 3, 2014.
(Continued)

*Primary Examiner* — Kerri L McNally
*Assistant Examiner* — Thang D Tran
(74) *Attorney, Agent, or Firm* — Oblon, McClelland, Maier & Neustadt, L.L.P.

(57) ABSTRACT

A method of access to a motor vehicle includes establishing contactless communication according to an NFC protocol between a badge of the motor vehicle and a smartphone, communicating an authentication key from the badge to the smartphone, transmitting the authentication key of the smartphone to a server by telephone communication, the server being capable of communicating with the vehicle, and recognizing the authentication key by the server and transmitting data concerning a status of the vehicle from the server to the smartphone.

7 Claims, 1 Drawing Sheet

(51) Int. Cl.
*G07C 5/00* (2006.01)
*G07C 5/08* (2006.01)

(52) U.S. Cl.
CPC ........... *G07C 9/00857* (2013.01); *G07C 5/08* (2013.01); *G07C 2009/00317* (2013.01)

(58) Field of Classification Search
USPC ................ 340/5.61, 10.1–10.6, 572.1–572.9
See application file for complete search history.

(56) References Cited

U.S. PATENT DOCUMENTS

| | | | | | |
|---|---|---|---|---|---|
| 2003/0103482 | A1* | 6/2003 | Van Bosch | H04L 29/06 | 370/338 |
| 2004/0187011 | A1* | 9/2004 | Lee | G06F 21/10 | 713/193 |
| 2008/0059806 | A1* | 3/2008 | Kishida | G06F 21/35 | 713/186 |
| 2009/0119657 | A1* | 5/2009 | Link, II | G06F 8/65 | 717/171 |
| 2009/0273438 | A1* | 11/2009 | Sultan | G07C 9/00103 | 340/5.7 |
| 2011/0257817 | A1 | 10/2011 | Tieman | | |
| 2012/0031363 | A1* | 2/2012 | Barta | B60R 25/04 | 123/179.2 |
| 2012/0079002 | A1* | 3/2012 | Boll | G07C 5/008 | 709/203 |
| 2012/0095642 | A1* | 4/2012 | Nishida | H04L 9/3226 | 701/31.4 |
| 2012/0313796 | A1* | 12/2012 | Lee | B60R 25/2018 | 340/989 |
| 2012/0323772 | A1* | 12/2012 | Michael | G06Q 40/00 | 705/39 |
| 2013/0082820 | A1* | 4/2013 | Tieman | G07C 9/00309 | 340/5.61 |
| 2013/0179689 | A1* | 7/2013 | Matsumoto | G06F 8/61 | 713/171 |
| 2013/0211623 | A1* | 8/2013 | Thompson | G07C 5/008 | 701/2 |
| 2013/0259232 | A1* | 10/2013 | Petel | H04L 63/0492 | 380/270 |
| 2013/0293349 | A1* | 11/2013 | Templ | G07C 9/00111 | 340/5.61 |
| 2013/0301829 | A1* | 11/2013 | Kawamura | H04L 9/0816 | 380/44 |
| 2013/0304278 | A1* | 11/2013 | Chen | G06F 17/00 | 701/2 |
| 2013/0317693 | A1* | 11/2013 | Jefferies | G07B 15/00 | 701/31.5 |
| 2014/0043141 | A1* | 2/2014 | Cazanas | G06F 21/35 | 340/5.81 |
| 2014/0058586 | A1* | 2/2014 | Kalhous | B60R 25/24 | 701/2 |
| 2014/0187149 | A1* | 7/2014 | Lortz | H04W 4/008 | 455/41.1 |
| 2014/0200760 | A1* | 7/2014 | Kaufmann | G07C 5/008 | 701/29.3 |
| 2014/0298434 | A1* | 10/2014 | Prchal | H04W 4/026 | 726/7 |
| 2015/0339334 | A1* | 11/2015 | Hanke | G06F 17/30725 | 707/736 |

FOREIGN PATENT DOCUMENTS

| | | | |
|---|---|---|---|
| WO | 2012/041885 | A1 | 4/2012 |
| WO | 2012/160298 | A1 | 11/2012 |

OTHER PUBLICATIONS

French Search Report dated Feb. 28, 2014 in French Application 1355073 Filed Jun. 3, 2013.

* cited by examiner

DEVICE FOR PROTECTING THE ACCESS TO A VEHICLE BY MEANS OF A MOBILE PHONE

TECHNICAL FIELD

The present invention relates to the field of accessing a vehicle and information on said vehicle by means of a telephone of the smartphone type, and is more particularly concerned with protected access to the vehicle and to the vehicle data.

PRIOR ART

The multiple functions of mobile phones of the smartphone type have opened up possibilities of communication and connection with motor vehicles, in respect of both physical access to the vehicle and access to data on location and/or operation (state of tires, fuel level, etc.). However, controlling a vehicle by means of a telephone can give rise to security problems, and a number of precautions must be taken for the authentication of the person requesting access via his telephone.

There is a known way of using a contactless or "hands free" badge for locking and unlocking a vehicle, and also for starting the vehicle, these badges using radio frequency technology. Application FR2700625 filed by the present applicant is an example of this.

The document FR2965434 also discloses a method of pairing a mobile phone with a vehicle, by means of a locking/unlocking key paired with the vehicle in the factory via the NFC protocol, in order to enable the vehicle to be secured or unlocked by telephone, using the NFC protocol.

In these cases, however, the user must be located near the vehicle in order to control it, thus limiting the possible uses.

The present invention proposes a method based on NFC technology using a small card, similar to a bank card, carrying the authentication means, which can be paired with a mobile phone to enable services to be provided for the remote control of the vehicle, in other words without the vehicle being near the telephone, as well as different services such as:

- remote maintenance,
- the state of the vehicle,
- geolocation,
- control of openable body sections,
- conditioning the vehicle, including air conditioning adjustment, seat adjustment, and radio pre-setting,
- engine starting,
- opening and closing in accordance with rules of security and ownership, etc.

DISCLOSURE OF THE INVENTION

The present invention is based on a method of access to a motor vehicle, characterized in that it comprises the following steps:

- establishing contactless communication according to the NFC protocol between a badge of the motor vehicle and a smartphone,
- communicating an authentication key from the badge to the smartphone,
- transmitting the authentication key of the smartphone to a server by telephone communication, the server being capable of communicating with the vehicle,

- recognizing the authentication key by means of the server, and transmitting data concerning the status of the vehicle from the server to the smartphone.

Advantageously, the present invention proposes at least one of the following characteristics:

- the data on the state of the vehicle comprise at least one of the following data: the mileage, the various liquid levels in the reservoirs, and the state of charge of the starting, lighting and ignition battery, and of the traction battery if the vehicle is an electric or hybrid vehicle,
- the method comprises a step of supplementary authentication by the user of the smartphone for the purpose of accessing operating data of the vehicle,
- the operating data of the vehicle comprise the geolocation of the vehicle and/or the locked/unlocked state of the vehicle,
- the method comprises a step of transmitting a change of state of the operation of the vehicle from the smartphone to the server, which forwards the changes of state to the vehicle computer, which then modifies the elements in question,
- the change of state of the operation of the vehicle is at least one of the following changes:
    - A change in the customization data for the interior arrangements
    - Modification of data concerning the telephone directory and the radio pre-setting
    - A change in the locked/unlocked state of the vehicle
    - Modification of the operation of the air conditioning/heating of the passenger compartment
    - A change of state in the engine operation: started/stopped
    - A change of state of the steering lock devices

DESCRIPTION OF THE DRAWINGS

Other characteristics and advantages of the invention will be evident from the following description, which is purely illustrative and non-limiting and is to be read with reference to the attached drawings, in which.

DETAILED DESCRIPTION OF THE INVENTION

The present invention proposes the use of the NFC technology and protocol in a badge 2 having a compact format, of the bank card type, said badge allowing direct access to the vehicle 4, as is known in the field. According to the invention, the badge also contains an authentication key, in the form of the VIN (for "Vehicle Identification Number") code of the vehicle, this unique code being given to each vehicle and being shown on the vehicle chassis. This unique code can be used to protect the identification of a potential user, who is then recognized as the owner of a "key" and can therefore interact with the vehicle via an application on his smartphone. This VIN code is used for remote access to a server 6. This access is provided by a mobile phone or smartphone 8 which also uses NFC technology. The VIN code cannot be read directly by a smartphone, but can be decoded by a dedicated server which has the key for reading the VIN code.

The server 6 can also communicate with the vehicle 4 by any known technology, notably via any available networks based on the 2G/3G rules. The link is of the protected http type. Firewalls can be used to increase the protection of exchanges between the car and the server.

Thus, according to the invention, the badge 2 is a physical object which can be used to keep control of the vehicle. It is, notably, impossible to start the vehicle without this badge. However, the smartphone can be used to create a protected gateway for accessing the vehicle data and can act as the equivalent of the badge, but in a remote way.

Thus an inexpensive card is used to protect the authentication of the smartphone 8, allowing remote access to the vehicle 4 via the smartphone and a remote server 6. A special application must be loaded into the smartphone 8 in advance for access to the server 6 and for displaying the various items of data and adjustments.

To increase the protection of the access to the vehicle and its data, two access levels may be provided, after the pairing between the badge 2 and the smartphone 8 has been completed:

- one without a code for all information concerning the data on the state of the vehicle (pressure, levels, etc.)
- the other with a PIN code, concerning more confidential information on the operation of the vehicle such as the location of the vehicle, opening/closing, starting, etc., which could be remotely launched (to allow a person to enter the car, etc.).

Thus an embodiment of the invention can follow the sequence of steps shown in FIGS. 2*a* to 2*d:*

Figure 1:
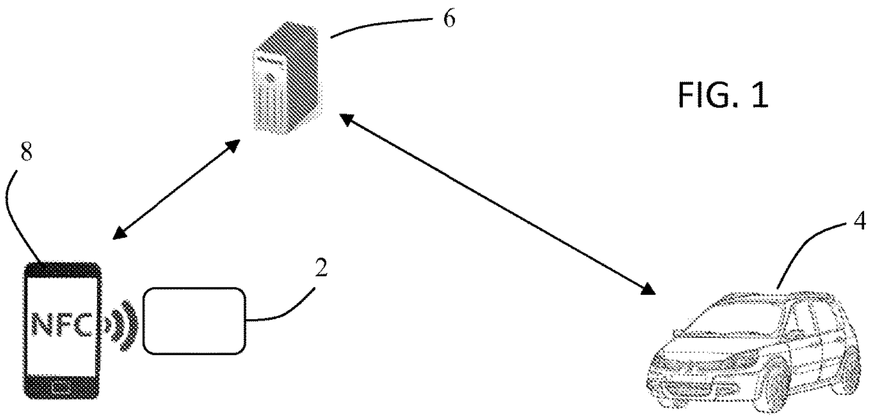
FIG. 1 is a diagram of the principle of protection and exchange according to the invention.
Figure 2A:
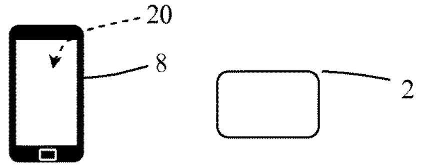
FIGS. 2*a*, 2*b*, 2*c*, and 2*d* show an exemplary embodiment of the invention.
Figure 2B:
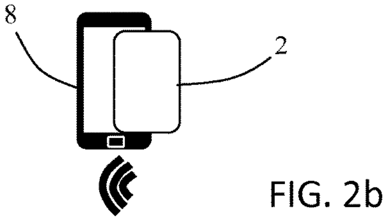
Figure 2C:
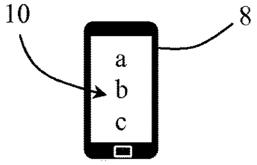
Figure 2D:
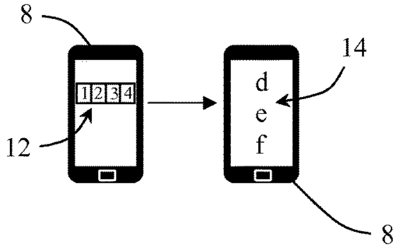

- Physical presence of the badge 2 and the smartphone 8 required (FIG. 2*a*), after an application specific to the envisaged data access has been loaded into the smartphone,
- Pairing of the smartphone 8 and the badge 2, for example by pressing one against the other (FIG. 2*b*), the NFC technology requiring that both elements to be paired be very close to one another,
- Automatic launch of the special program with telephone connection to the server 6, recognition by the server of the authentication key (VIN code of the vehicle) transmitted by the badge 2 during pairing with the smartphone 8, and transmission of a first batch 10 of data a, b, c to the smartphone 8 which displays them by means of the program (FIG. 2*c*).

In fact, the motor vehicle 4 comprises, notably, a computer capable of transmitting data on the state, position and customization of the vehicle to the server 6, and capable of receiving, from said server, operating commands and instructions via appropriate telephone networks.

This first batch of data is concerned with data considered to be non-confidential for the vehicle owner, such as the mileage, the fuel level or the charge level for an electric vehicle, the temperature, and, more generally, the condition of the vehicle (tire pressure, liquid levels, state of wear, etc.).

- At a second stage, for more advanced protected functions concerned with the operation of the vehicle, and notably for the remote control of certain functions of the vehicle, a code 12 must be entered on the smartphone 8 for the functions shown below, although this list is not exhaustive:
- Geolocation of the vehicle
- Starting and stopping the engine
- Air conditioning
- Opening/closing of the vehicle
- Adjustment of seat positions, radio, telephone directory, etc.

The server 6 can then communicate a second batch 14 of data d, e, f, and, if the user so wishes, can use the privileged link with the vehicle to act on the latter to pre-adjust seat positions, the driving position, radio stations and an electronic diary, or to pre-heat the interior of the passenger compartment or lock/unlock access to the vehicle for a person located in the proximity thereof.

Thanks to the present invention, it is then possible to simply control not only the opening and closing of a user's vehicle at a distance out of the range of direct wireless links (about a hundred meters) but also the starting of the vehicle's engine and the unlocking of all the anti-theft devices (notably the steering column lock).

The present invention is very simple to use, since the simple pairing of the badge with the smartphone allow the identification and validation of the server which thus enables data exchange and interaction to take place remotely and out of the range of conventional devices. The solution also has increased security, since the badge must be pressed against the smartphone for the purpose of identification.

It would be feasible to provide a plurality of badges 2 carrying the VIN data and the NFC protocol, with the option of customizing each badge, or even to restrict access to certain functions (notably the starting of the vehicle, but also the limiting of the maximum speed, for example).

The invention claimed is:

1. A method of access to a motor vehicle, comprising:

establishing contactless communication according to an NFC protocol between a badge of the motor vehicle and a smartphone;

communicating an authentication key from the badge to the smartphone;

transmitting the authentication key of the smartphone to a server by communication, the server being in communication with the vehicle;

recognizing the authentication key by the server; and transmitting first data from the server to the smartphone in response to the recognizing of the authentication key, wherein the first data includes operating characteristics of physical portions of the vehicle; and transmitting second data from the server to the smartphone in response to the recognizing of the authentication key and reception of a correct pin code from the smartphone, wherein start up information for remotely starting up an engine of the motor vehicle is included in the second data, wherein the authentication key is generated from a VIN of the motor vehicle, and wherein transmission of the first data is authenticated based only on the authentication key generated from the VIN of the motor vehicle without requiring user password input.

2. The method of access to a motor vehicle as claimed in claim 1, wherein the first data concerning the status of the vehicle comprise at least one of the following data: mileage, various liquid levels in reservoirs, and a state of charge of starting, lighting and ignition battery, and of a traction battery if the vehicle is an electric or hybrid vehicle.

3. The method of access to a motor vehicle as claimed in claim 1, wherein the second data of the vehicle comprise a geolocation of the vehicle and/or a locked/unlocked state of the vehicle.

4. The method of access to a motor vehicle as claimed in claim 1, further comprising:

transmitting a change of state of operation of the vehicle from the smartphone to the server, which forwards the changes of state to a computer of the vehicle, which then modifies elements accordingly.

5. The method of access to a motor vehicle as claimed in claim 4, wherein the change of state of the operation of the vehicle is at least one of the following changes:

a change in customization data for interior arrangements, modification of data concerning a telephone directory and radio pre-setting, a change in a locked/unlocked state of the vehicle, modification of an operation of an air conditioning or heating of a passenger compartment of the vehicle, a change of state in an engine operation, including when the engine is started or stopped, and a change of state of steering lock devices.

6. The method of access to a motor vehicle as claimed in claim 1, wherein the first data include at least one of mileage of the vehicle, a fuel level or a charge level for the vehicle, a temperature of the vehicle, a tire pressure of the vehicle, and liquid levels of the vehicle.

7. A system for accessing to a motor vehicle, comprising:

a smartphone including:

first circuitry configured to establish contactless communication according to an NFC protocol between a badge of the motor vehicle and the smartphone, receive a communication of an authentication key from the badge at the smartphone, and transmit the authentication key of the smartphone to a server by communication, the server being in communication with the vehicle; and the server including:

second circuitry configured to recognize the authentication key, transmit first data from the server to the smartphone in response to the recognizing of the authentication key, wherein the first data includes operating characteristics of physical portions of the vehicle, and transmit second data from the server to the smartphone in response to the recognizing of the authentication key and reception of a correct pin code from the smartphone, wherein start up information for remotely starting up an engine of the motor vehicle is included in the second data, wherein the authentication key is generated from a VIN of the motor vehicle, wherein transmission of the first data is authenticated based only on the authentication key generated from the VIN of the motor vehicle without requiring user password input.

* * * * *